(12) United States Patent
Jeon et al.

(10) Patent No.: US 12,244,001 B2
(45) Date of Patent: Mar. 4, 2025

(54) NEGATIVE ELECTRODE FOR SECONDARY BATTERY AND SECONDARY BATTERY INCLUDING THE SAME

(71) Applicant: SK On Co., Ltd., Seoul (KR)

(72) Inventors: Chan Young Jeon, Daejeon (KR); So Hyun Park, Daejeon (KR); Hae Suk Hwang, Daejeon (KR); Hee Gyoung Kang, Daejeon (KR)

(73) Assignee: SK On Co., Ltd., Seoul (KR)

( * ) Notice: Subject to any disclaimer, the term of this patent is extended or adjusted under 35 U.S.C. 154(b) by 461 days.

(21) Appl. No.: 17/577,624

(22) Filed: Jan. 18, 2022

(65) Prior Publication Data

US 2022/0231272 A1     Jul. 21, 2022

(30) Foreign Application Priority Data

Jan. 19, 2021   (KR) .................. 10-2021-0007296

(51) Int. Cl.
| | |
|---|---|
| *H01M 4/133* | (2010.01) |
| *H01M 4/587* | (2010.01) |
| *H01M 10/0525* | (2010.01) |
| *H01M 4/02* | (2006.01) |

(52) U.S. Cl.
CPC ........... *H01M 4/133* (2013.01); *H01M 4/587* (2013.01); *H01M 10/0525* (2013.01); *H01M 2004/021* (2013.01); *H01M 2004/027* (2013.01)

(58) Field of Classification Search
CPC .. H01M 4/133; H01M 4/587; H01M 10/0525; H01M 2004/021; H01M 2004/027; H01M 4/13; Y02E 60/10

USPC ...................................... 429/231.8
See application file for complete search history.

(56) References Cited

U.S. PATENT DOCUMENTS

| | | | | |
|---|---|---|---|---|
| 2008/0248387 A1* | 10/2008 | Hinoki | .............. | H01M 10/4235 429/209 |
| 2009/0311599 A1 | 12/2009 | Kawai et al. | | |
| 2010/0092864 A1* | 4/2010 | Yokomizo | ........... | H01M 4/1393 429/212 |

(Continued)

FOREIGN PATENT DOCUMENTS

| | | |
|---|---|---|
| KR | 101365568 B1 | 2/2014 |
| KR | 101817418 B1 | 1/2018 |

OTHER PUBLICATIONS

Chen et al., "Tortuosity Effects in Lithium-Metal Host Anodes", Joule, Apr. 15, 2020, pp. 1-15, vol. 4.

(Continued)

*Primary Examiner* — James M Erwin
*Assistant Examiner* — Kevin Nguyen
(74) *Attorney, Agent, or Firm* — The Webb Law Firm

(57) ABSTRACT

Provided is a negative electrode for a secondary battery including: a current collector; and a negative electrode active material layer including a negative electrode active material, formed on the current collector, with the negative electrode satisfying Relation 1:

$$3.0 < \tau^* D_P < 7.2 \qquad \text{[Relation 1]}$$

with τ a tortuosity of the negative electrode, and $D_P$ a pellet density (g/cm$^3$) of the negative electrode active material, measured by pressing the negative electrode active material at 8 kN/cm$^2$. Also provided is a secondary battery including the same.

10 Claims, 1 Drawing Sheet

(56) References Cited

U.S. PATENT DOCUMENTS

| | | | | |
|---|---|---|---|---|
| 2014/0159668 A1* | 6/2014 | Whitacre | ............ | H01M 4/583 |
| | | | | 429/231.5 |
| 2014/0356707 A1* | 12/2014 | Kwon | ................ | H01M 4/587 |
| | | | | 427/113 |
| 2018/0040875 A1 | 2/2018 | Kim et al. | | |
| 2018/0069235 A1* | 3/2018 | Lee | .................. | H01M 4/386 |
| 2019/0181437 A1* | 6/2019 | Lee | .................. | H01M 4/1395 |

OTHER PUBLICATIONS

Park et al., "A Review on 3D Structure Formation, Analysis and Performance Prediction Technique for All-solid-state Electrode and Battery", Journal of the Korean Electrochemical Society, 2019, pp. 139-147, vol. 22:4.

* cited by examiner

NEGATIVE ELECTRODE FOR SECONDARY BATTERY AND SECONDARY BATTERY INCLUDING THE SAME

CROSS-REFERENCE TO RELATED APPLICATION

This application claims priority to Korean Patent Application No. 10-2021-0007296 filed Jan. 19, 2021, the disclosure of which is hereby incorporated by reference in its entirety.

BACKGROUND OF THE INVENTION

Field of the Invention

The following disclosure relates to a negative electrode for a secondary battery and a secondary battery including the same.

Description of Related Art

Recently, as the demand for electronic devices such as mobile devices increases, weight reduction and miniaturization of an electrochemical battery (secondary battery) have been further developed for increasing portability of electronic devices. Along with the trend, development of a high-capacity and high-power lithium secondary battery is demanded.

For achieving the high capacity of the lithium secondary battery, a mix density of a negative electrode is being increased. When the mix density of the negative electrode is increased, a content of a negative electrode active material in the same negative electrode volume may be increased, so that an energy density is increased. However, as the mix density is increased, a porosity of a negative electrode is decreased to slow down a diffusion rate of a lithium ion, and an occlusion/release reaction of the lithium ion in the negative electrode is not performed well and output performance is rather decreased. This problem occurs more seriously in a high rate charge and discharge process, and thus, even in the case in which a content of an active material in the negative electrode is increased, a discharge capacity and cycle characteristics are significantly decreased during high rate charge and discharge. Thus, development of a negative electrode allowing high output expression even at a high mix density is needed.

SUMMARY OF THE INVENTION

An embodiment of the present invention is directed to improve high output characteristics of a high mix density of a negative electrode by adjusting deformation of negative electrode active material particles and a negative electrode pore structure, in implementing a high mix density negative electrode.

In one general aspect, a negative electrode for a secondary battery includes a current collector; and a negative electrode active material layer including a negative electrode active material, formed on the current collector, wherein the negative electrode satisfies the following Relation 1:

$$3.0 < \tau^* D_P < 7.2 \qquad [\text{Relation 1}]$$

wherein $\tau$ is a tortuosity of the negative electrode, and $D_P$ is a pellet density (g/cm$^3$) of the negative electrode active material, measured by pressing the negative electrode active material at 8 kN/cm$^2$.

The negative electrode may have a tortuosity ($\tau$) of 1 to 4.

The negative electrode active material may have a pellet density ($D_P$) of 1.0 to 2.0 g/cm$^3$.

The negative electrode active material may have a pellet resistance ($R_P$) of 0.005 to 0.01 Ohm, and the pellet resistance may be a resistance value measured by pressing the negative electrode active material at 8 kN/cm$^2$.

The negative electrode may further satisfy the following Relation 2:

$$4.3 < \tau^* D_P < 6.4 \qquad [\text{Relation 2}]$$

wherein $\tau$ is a tortuosity of a negative electrode, and $D_P$ is a pellet density of the negative electrode active material, measured by pressing the negative electrode active material at 8 kN/cm$^2$.

The negative electrode active material may be a carbonaceous active material.

The negative electrode may satisfy at least two of the following Relations 3 to 5:

$$0.2 < V_P < 0.5 \qquad [\text{Relation 3}]$$

wherein $V_P$ is a pore volume (g/cc) of the negative electrode, $$8 < D < 20 \qquad [\text{Relation 4}]$$

wherein D is D50 (μm) of the negative electrode active material, $$0.8 < D_T < 1.5 \qquad [\text{Relation 5}]$$

wherein $D_T$ is a tap density (g/cc) of the negative electrode active material.

A pore size in the negative electrode active material layer may be 500 to 800 nm.

The negative electrode may have a mix density of 1.65 g/cc to 1.85 g/cc.

In another general aspect, a secondary battery includes: the negative electrode; a positive electrode; a separator; and an electrolyte solution.

Other features and aspects will be apparent from the following detailed description, the drawings, and the claims.

BRIEF DESCRIPTION OF THE DRAWINGS

FIG. 1A is a cross-sectional schematic diagram of a negative electrode having a high pellet density and large active material particle deformation in production of the negative electrode, and FIG. 1B is a cross-sectional schematic diagram of a negative electrode having a low pellet density and small active material particle deformation in production of the negative electrode.

DESCRIPTION OF THE INVENTION

Figure 1A:
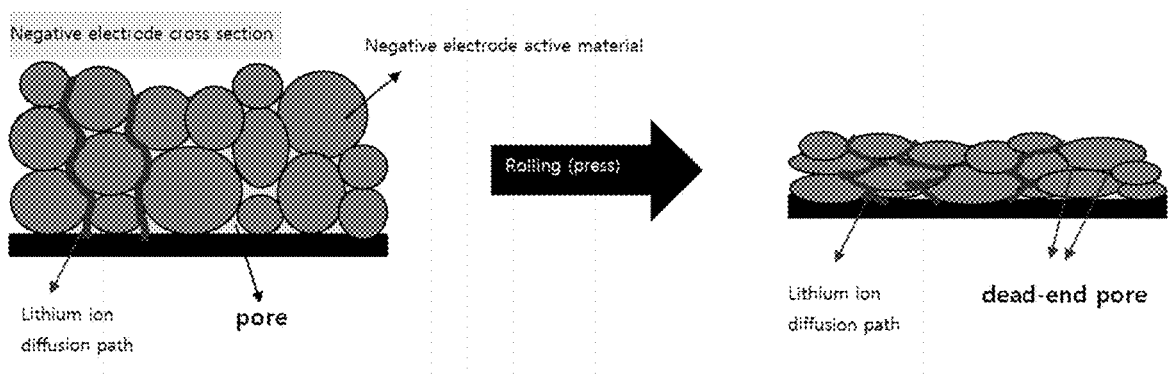
FIGS. 1A and 1B represent schematic diagrams of deformed negative electrode active material particles according to a rolling process. Specifically.

Advantages and features of the present invention and methods to achieve them will be elucidated from exemplary embodiments described below in detail with reference to the accompanying drawings. However, the present invention is not limited to exemplary embodiments disclosed below, but will be implemented in various forms. The exemplary embodiments of the present invention make disclosure of the present invention thorough and are provided so that those skilled in the art can easily understand the scope of the present invention. Therefore, the present invention will be defined by the scope of the appended claims. Detailed description for carrying out the present invention will be provided with reference to the accompanying drawings below. Regardless of the drawings, the same reference number indicates the same constitutional element, and "and/or" includes each of and all combinations of one or more of mentioned items.

Unless otherwise defined herein, all terms used in the specification (including technical and scientific terms) may have the meaning that is commonly understood by those skilled in the art. Throughout the present specification, unless explicitly described to the contrary, "comprising" any elements will be understood to imply further inclusion of other elements rather than the exclusion of any other elements. In addition, unless explicitly described to the contrary, a singular form includes a plural form herein.

In the present specification, it will be understood that when an element such as a layer, film, region, or substrate is referred to as being "on" or "above" another element, it can be directly on the other element or intervening elements may also be present.

An embodiment of the present invention provides a negative electrode for a secondary battery including: a current collector; and a negative electrode active material layer including a negative electrode active material, formed on the current collector, wherein the negative electrode satisfies the following Relation 1:

$$3.0 < \tau^* D_P < 7.2 \quad \text{[Relation 1]}$$

wherein $\tau$ is a tortuosity of the negative electrode, and $D_P$ is a pellet density (g/cm$^3$) of the negative electrode active material, measured by pressing the negative electrode active material at 8 kN/cm$^2$.

Generally, as a method for achieving high capacity of a secondary battery, energy density may be increased by a high mix density of a negative electrode. However, as the mix density is increased, pores which are diffusion (transfer) channels for lithium ions in the negative electrode are deformed, so that the lithium ions do not move well and output performance is rather decreased. In addition, a loading amount of a negative electrode active material or a rolling density of a negative electrode is decreased to increase a porosity of the negative electrode so that ions and/or electrons move well, thereby achieving high rate charge and discharge performance, but it is difficult to achieve a higher density of the negative electrode, making it difficult to express high capacity.

In the present invention, both deformation of negative electrode active material particles and pore structure of a negative electrode are adjusted, thereby improving high output characteristics of the negative electrode having a high mix density. Specifically, the negative electrode for a secondary battery according to the present invention has a pellet density ($D_P$) of a negative electrode active material and a tortuosity ($\tau$) of a negative electrode which satisfy the following Relation 1, thereby allowing implementing a high mix density of 1.65 g/cc or more and improving high rate charge performance.

In general, the tortuosity is used as an indicator which may represent flow through properties in a porous material. That is, as the tortuosity is low, the flow through properties of a porous material is more increased, so that a transmitter such as ions may pass the porous material better. However, when the performance of the negative electrode for a secondary battery is determined only by the tortuosity described above as the indicator, its accuracy is very low. The tortuosity is a factor determined by the shape and structure of the negative electrode, and in general, as the factor of the mediator such as thickness and density is increased, the tortuosity tends to be increased. Therefore, it may be misleading to estimate performance by tortuosity without interpretation of the structure of a negative electrode. As a non-limiting example, when a negative electrode having small thickness and density is produced for lowering the tortuosity, the energy density of an electrode is excessively lowered. That is, when the performance of a negative electrode is determined only by the tortuosity, the above problems may be overlooked, and thus, comprehensive analysis of the tortuosity and a structure of the negative electrode is needed for evaluating performance of a battery accurately.

Meanwhile, dead-end pores formed due to excessive deformation of negative electrode active material particles during a rolling process may exist in the negative electrode. Since a large amount of dead-end pores in the negative electrode block the diffusion path itself of lithium ions, formation of the dead-end pores may be decreased as much as possible in the rolling process.

The value of $\tau^* D_P$ of the negative electrode according to the present invention may satisfy 3.0 to 7.2, preferably 3.5 to 7.1, and more preferably 4.3 to 6.4. Here, $D_P$ is a pellet density (g/cm$^3$) of the negative electrode active material, measured by pressing the negative electrode active material at 8 kN/cm$^2$. Within the range, a high mix density of 1.65 g/cc or more, preferably 1.65 g/cc to 1.85 g/cc may be implemented only by the negative electrode active material having a low pellet density, and a lithium ion diffusion path extension or blockage problem due to the negative electrode active material particle deformation in the rolling process may be decreased.

Specifically, the tortuosity ($\tau$) of the negative electrode may be calculated by the following Relation:

$$\tau = (R_{ion} \times A \times \kappa \times \varepsilon)/d$$

wherein $R_{ion}$ is an ionic diffusion resistance (Ohm) by impedance analysis, A is an area of a negative electrode (cm$^2$), $\kappa$ is an ion conductivity (mS/cm) of an electrolyte solution, $\varepsilon$ is a porosity of a negative electrode, and d is a thickness (μm) of a negative electrode.

The tortuosity ($\tau$) of the negative electrode may be 1 to 4, preferably 3 to 4. As the tortuosity value of the negative electrode is low, a diffusion rate of lithium ions is increased, which is advantageous for high rate performance improvement. However, the electrode (negative electrode) has a structure in which particles different from each other are packed, and it is difficult to extremely lower the tortuosity of an electrode under specific electrode density or electrode slurry loading amount. As a non-limiting example, when the loading amount of a negative electrode slurry on a current collector is 10 mg/cm$^2$ or more, it is practically very difficult to lower the tortuosity of the negative electrode to 3 or less.

The pellet density ($D_P$) of the negative electrode active material is a pellet density measured by pressing the negative electrode active material at 8 kN/cm$^2$. Specifically, the pellet density ($D_P$) of a negative electrode active material may be obtained by introducing 2 g (W) of the negative electrode active material to a pelletizer round mold having a diameter of 20 mm (D), pressing the mold at 25 kN for 10 seconds, releasing the pressure, measuring a height (H2) of the pelletizer, and calculating the pellet density by the following Relation:

$$D_P = W/[\pi \times (D/2)^2 \times (H2-H1)/1000]$$

wherein W is an amount of a negative electrode active material introduced, D is a diameter (mm) of a pelletizer mold, and H1 and H2 are a height (mm) of the pelletizer before and after pressing.

The pellet density ($D_P$) of the negative electrode active material may be 1.0 to 2.0 g/cm³, preferably 1.50 to 1.85 g/cm³, and the pellet resistance ($R_P$) under the pressing conditions of 8 kN/cm² which is the same as the pellet density measurement conditions described above may be 0.005 to 0.01 Ohm, preferably 0.005 to 0.008 Ohm, and more preferably 0.0055 to 0.0065 Ohm.

As shown in FIG. 1A, when the pellet density ($D_P$) is excessively high or the pellet resistance ($R_P$) is excessively low, the negative electrode active material particles are greatly deformed during the high rolling process of a negative electrode production process, so that the diffusion path of lithium ions is extended to increase diffusion resistance thereby or pores which are a diffusion path of lithium ions are closed to cause formation of dead-end pores, thereby decreasing high rate charge and discharge performance.

Figure 1B:
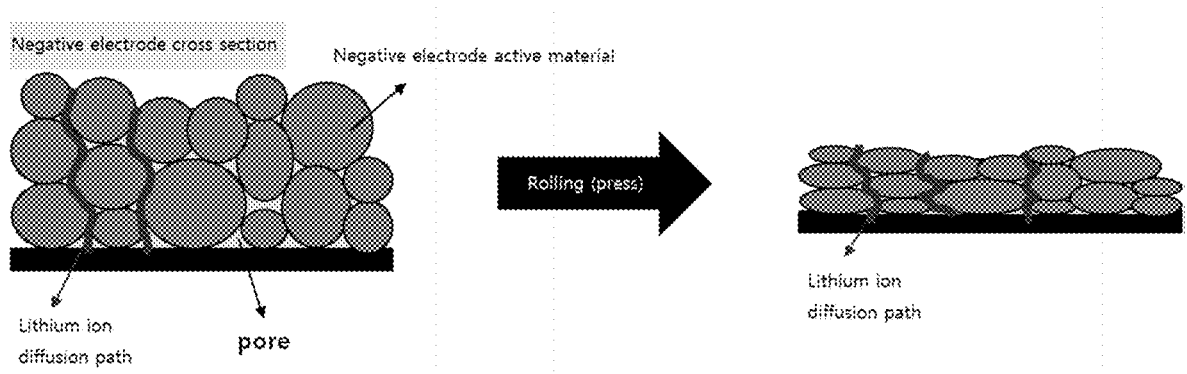

However, within the range of the pellet density ($D_P$) and the pellet resistance ($R_P$) of the negative electrode active material, as shown in FIG. 1B, the negative electrode active material particles are not deformed much, thereby suppressing the problem that the diffusion path of lithium ions are excessively extended to increase diffusion resistance. In addition, contactability between the negative electrode active material particles is improved to supply a conductive path during charge and discharge to lower resistance.

The negative electrode for a secondary battery according to an embodiment of the present invention may satisfy the following Relation 2:

$$4.3 < \tau * D_P < 6.4 \qquad \text{[Relation 2]}$$

wherein τ is a tortuosity of the negative electrode, and $D_P$ is a pellet density (g/cm³) of the negative electrode active material, measured by pressing the negative electrode active material at 8 kN/cm². Within the range, a charge efficiency of 90% or more may be shown even under charge conditions of 2 C-rate.

The negative electrode for a secondary battery according to an embodiment of the present invention may satisfy at least two of the following Relations 3 to 5:

$$0.2 < V_P < 0.5 \qquad \text{[Relation 3]}$$

wherein $V_P$ is a pore volume (g/cc) of the negative electrode, $$8 < D_T < 20 \qquad \text{[Relation 4]}$$

wherein D is D50 (μm) of the negative electrode active material, $$0.8 < D_T < 1.5 \qquad \text{[Relation 5]}$$

wherein $D_T$ is a tap density (g/cc) of the negative electrode active material.

Specifically, the pore volume of the negative electrode may be 0.2 to 0.5 g/cc, preferably 0.2 to 0.3 g/cc, and may be measured using a mercury injection method. Here, a size of the pores by a BET method in the negative electrode may be 500 to 800 nm, preferably 500 to 700 nm.

The particle size D of the negative electrode active material may refer to a particle diameter (D50) with a cumulative volume of 50% when cumulated from the smallest particle in measurement of a particle size distribution by a laser scattering method. Specifically, D50 was measured by collecting a sample according to a KS A ISO 13320-1 standard and measuring a particle size distribution using Mastersizer 3000 from Malvern Panalytical Ltd.

The tap density of the negative electrode active material may be 0.8 to 1.5 g/cc, preferably 0.8 to 1.2 g/cc. The tap density may be measured using a tap density measuring apparatus (Autotap available from Quantachrome). Specifically, a 25 ml measuring cylinder is filled with 10 g of a negative electrode active material, and is tapped 3,000 times with a stroke length of 10 mm to measure the tap density from the volume and the weight of the negative electrode active material.

Generally, when the negative electrode active material having a pellet density ($D_P$) of 2.0 g/cm³ or less is used, the particles are not easily deformed in the rolling process of the production process of the negative electrode, and also, since a restoring force to an initial volume is large after rolling, it is difficult to implement a high mix density of 1.7 g/cc or more. Meanwhile, even in the case of implementing the high mix density, a problem such as excessive deformation of particles arises to cause performance deterioration.

As the negative electrode for a secondary battery according to an embodiment of the present invention satisfies at least two of Relations 3 to 5, a negative electrode active material having a pellet density ($D_P$) of 2.0 g/cm³ or less may be applied to minimize particle deformation in the rolling process to suppress closure or expansion of pores in the particles, while the rolling strength for producing the negative electrode having a high mix density may be decreased. Accordingly, a high mix density of 1.65 g/cc or more, preferably 1.65 g/cc to 1.85 g/cc may be implemented with a negative electrode active material having a low pellet density, and high capacity and high rate charge and discharge performance may be improved.

The negative electrode active material may be a carbonaceous active material, and specifically, may include one or more selected from the group consisting of natural graphite, artificial graphite, graphitized carbon fiber, graphitized mezocarbon microbeads, and amorphous carbon.

The negative electrode active material layer further includes a binder, and the binder may be an aqueous binder. Specifically, the binder may be styrene-butadiene rubber, acrylated styrene-butadiene rubber, polyvinylalcohol, sodium polyacrylate, a copolymer of propylene and an olefin having 2 to 8 carbon atoms, polyacrylamide, a copolymer of (meth)acryl acid and (meth)acrylic acid alkyl ester, or a combination thereof.

When the aqueous binder is used, the electrode active material may be bound to the current collector well with the aqueous binder without affecting the viscosity of a slurry, but since the slurry is easily gelled due to the electrode active material and the conductive material which are fine particles, a thickener for imparting viscosity to the slurry to make a more stable slurry may be further included. As an example, the thickener may be a mixture of one or more of cellulose-based compounds, specifically, carboxymethyl cellulose, hydroxypropylmethyl cellulose, methyl cellulose, or alkali metal salts thereof. As the alkali metal, Na, K, or Li may be used.

The negative electrode active material layer may further include a conductive material. The conductive material is used for imparting conductivity to the negative electrode, and is not particularly limited as long as it is a conventional electron-conductive material which does not cause a chemical change. As an example, the conductive material may be natural graphite, artificial graphite, carbon black, acetylene black, ketjen black, carbon fiber, carbon nanotubes, and a combination thereof, but is not limited thereto.

The current collector may be selected from the group consisting of a copper foil, a nickel foil, a stainless steel foil, a titanium foil, a nickel foam, a copper foam, a polymer substrate coated with a conductive metal, and a combination thereof, but is not limited thereto.

The present invention also provides a secondary battery including the negative electrode according to an exemplary embodiment of the present invention; a negative electrode; a separator interposed between the negative electrode and the positive electrode; and an electrolyte solution.

The secondary battery including the negative electrode according to an exemplary embodiment of the present invention may have not only improved fast charging characteristics but also improved long-term stability, which is thus preferred.

The positive electrode may include a current collector and a positive electrode active material layer positioned on the current collector. As the current collector, aluminum, copper, or the like may be used, but is not limited thereto.

Any material may be used as the positive electrode active material as long as it is a commonly used positive electrode active material. As an example, it may be a composite oxide of a metal selected from cobalt, manganese, nickel, and a combination thereof and lithium, but is not limited thereto.

The separator is not particularly limited as long as it is a separator known in the art. For example, the separator may be selected from glass fiber, polyester, polyethylene, polypropylene, polytetrafluoroethylene, or a combination thereof, may be in the form of nonwoven or woven fabric, and may be used optionally in the form of a single layer or multilayer structure.

The electrolyte solution includes a non-aqueous organic solvent and an electrolytic salt. The non-aqueous organic solvent may be ethylene carbonate (EC), propylene carbonate (PC), dimethyl carbonate (DMC), diethyl carbonate (DEC), ethylmethyl carbonate (EMC), 1,2-dimethoxyethene (DME), γ-butyrolactone (BL), tetrahydrofuran (THF), 1,3-dioxolane (DOL), diethylether (DEE), methyl formate (MF), methyl propionate (MP), sulfolane (S), dimethyl sulfoxide (DMSO), acetonitrile (AN), or a mixture thereof, but is not limited thereto. The electrolytic salt is a material which is dissolved in the non-aqueous organic solvent and serves as a source of electrolytic metal ions in the battery to allow basic operation of the secondary battery and is a material which promotes movement of electrolytic metal ions between a positive electrode and a negative electrode. As a non-limiting example, when the electrolytic metal is lithium, the electrolytic salt may be $LiPF_6$, $LiBF_4$, LiTFSI, $LiSbF_6$, $LiAsF_6$, $LiClO_4$, $LiCF_3SO_3$, Li $(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x and y are a natural number), LiCl, LiI, or a mixture thereof, but the present invention is not limited thereto. In addition, as the electrolytic salt, a known material may be used at a concentration for purpose, and if necessary, a known solvent or an additive may be further included for improving charge/discharge properties, flame retardancy, and the like.

Hereinafter, the preferred Examples and Comparative Examples of the present invention will be described. However, the following Examples are only a preferred exemplary embodiment of the present invention, and the present invention is not limited thereto.

EXAMPLES

Examples 1 to 5 and Comparative Examples 1 and 2

1. Production of Negative Electrode Active Material

A tap density, a pellet density, and a particle size were measured, and artificial graphite satisfying tap density 1.2 g/cc, pellet density 2.0 g/cc, and particle size <20 μm was selected to produce a negative electrode active material. Each negative electrode active material used in Examples 1 to 5 and Comparative Examples 1 and 2 has properties listed in the following Tables 1 to 3.

2. Production of Negative Electrode

Water was added to 93.4 wt % of the negative electrode active material, 3.0 wt % of a carbon black conductive material, 2.4 wt % of an SBR binder, and 1.2% CMC and mixed at room temperature for 120 minutes to produce a slurry. The produced slurry was applied to a Cu foil current collector at a loading amount of 13 mg/cm$^2$, dried, and rolled so that the mix density of a negative electrode was 1.7 g/cc, thereby producing a negative electrode. The negative electrodes produced in Examples 1 to 5 and Comparative Examples 1 and 2 have the properties listed in the following Tables 1 to 3.

3. Production of Half Battery

The negative electrode manufactured above, a lithium metal positive electrode, and a PE separator interposed between the negative electrode and the positive electrode were used, and an electrolyte solution was injected to manufacture a CR2016 coin cell. The assembled coin cell was paused at room temperature for hours to produce a half battery. Here, the electrolyte solution was obtained by mixing 1.0 M $LiPF_6$ as a lithium salt with an organic solvent (EC:EMC=1:4 vol %) and mixing 1 vol % of FEC as an electrolyte additive.

4. Evaluation of Physical Properties

1) Measurement of Tap Density ($D_T$) of Negative Electrode Active Material

A 25 ml measuring cylinder was filled with 10 g of a sample and was tapped 3,000 times with a stroke length of 10 mm, and the tap density was measured from the volume and the weight of the sample. After measuring three times, an average value was calculated, and the results are shown in Table 1. Here, it was confirmed that the results were within ±1% of an error range of each measurement.

2) Measurement of Pellet Density ($D_P$) of Negative Electrode Active Material

The pellet density is a volume change measured when sample was added to a container and pressed at a constant pressure; 2 g of a sample was pressed at 8 kN, a volume change at that time was measured, the pellet density of the same was calculated, and the results are shown in the following Table 1. The measurement method and the calculation formula of the pellet density are as follows.

[Measurement Method of Pellet Density]

a) A height of an empty pelletizer was measured. (height gauge, $H_1$, mm)

b) About 2±0.1 g (W, g) of a sample was added to a sample inlet of the pelletizer, and care was taken not to flow out or leak the sample out of the pelletizer.

c) The pelletizer was placed on the center of a manual type presser.

d) A lever of the manual type pressure was pulled to apply pressure while the gauge was confirmed until 8 kN.

e) The pressure was released after pressing for 10 seconds. Thereafter, the pelletizer was carefully taken out and then the height was measured. ($H_2$, mm)

[Calculation Formula of Pellet Density]

Pellet density=W/[π×(20/2)²×($H_2$−$H_1$)/1000], Diameter of hole of pelletizer: 20 mm

3) Measurement of Pellet Resistance ($R_P$) of Negative Electrode Active Material The pellet resistance was measured using a current through resistance meter under the same conditions as the pellet density ($D_P$) measurement conditions of the negative electrode active material.

4) Evaluation of Negative Electrode Tortuosity (τ)

A symmetric coin cell to which a working electrode and a counter electrode were identically applied with the negative electrode produced in Examples 1 to 5 and Comparative Examples 1 and 2. Here, the electrolyte solution was obtained by mixing 1.0 M $LiPF_6$ as a lithium salt with an organic solvent (EC:EMC=1:4 vol %) and mixing 1 vol % of FEC 1 as an electrolyte additive.

Subsequently, impedance spectroscopy (frequency range from 500 Khz to 100 mHz) was performed on the produced symmetric electrode. The results were expressed as a Nyquist plot, tortuosity was calculated by data interpretation, and the results are shown in Table 1. The calculation formula is as follows:

[Tortuosity Calculation Formula]

$$\text{Tortuosity } (\tau) = (R_{ion} \times A \times \upsilon \times \varepsilon)/d$$

($R_{ion}$: ionic diffusion resistance, A: electrode area, υ: ionic conductivity of electrolyte, ε: porosity, d: thickness)

5) Measurement of Negative Electrode Pore Characteristics

The pore volumes ($V_P$) of the negative electrodes produced in Examples 1 to 5 and Comparative Examples 1 and 2 were measured by a mercury penetration method, and the instrument used in the measurement was a mercury porosimetry (AutoPore IV 9505 available from Micromeritics).

In addition, the pore sizes in the negative electrodes produced in Examples 1 to 5 and Comparative Examples 1 and 2 were measured using a Brunauer-Emmett-Teller (BET) method.

6) Evaluation of Half Battery High Rate Charge Properties

The half batteries produced in Examples 1 to 5 and Comparative Examples 1 and 2 were charged and discharged at a low rate (0.1 C) for initial 3 to 5 cycles to stabilize the electrode and charged at a high rate (2 C) to evaluate high rate charge performance, and the results are shown in Table 1. Here, the high rate charge rate (%) was calculated by measuring a high rate charge amount relative to a low rate charge amount.

Evaluation Example

[Evaluation Example 1]: Comparison of High Rate Charge Properties of Secondary Battery Depending on whether Relation 1 (τ*$D_P$) was Satisfied For the negative electrodes and the half batteries produced in Examples 1 to 5 and Comparative Examples 1 and 2, Relation 1, $D_P$, τ, and the charge efficiency (%) of the present invention are shown in the following Table 1:

TABLE 1

|  | τ * $D_P$ (g/cc) | $D_P$ (g/cc) | τ | Charge efficiency (%) |
|---|---|---|---|---|
| Example 1 | 7.13 | 1.829 | 3.9 | 89% |
| Example 2 | 5.08 | 1.693 | 3.0 | 91% |
| Example 3 | 6.10 | 1.793 | 3.4 | 92% |
| Example 4 | 6.46 | 1.657 | 3.9 | 90% |
| Example 5 | 7.13 | 1.783 | 4.0 | 88% |
| Comparative Example 1 | 8.13 | 1.808 | 4.5 | 79% |
| Comparative Example 2 | 8.21 | 2.002 | 4.1 | 80% |

Referring to Table 1, in Examples 1 to 5 and Comparative Examples 1 and 2, the pellet density ($D_P$) of artificial graphite was all 2.0 g/cc or less, and thus, an artificial graphite active material having a relatively low rolling density (deformation degree under high pressure) was used. However, as a result of producing the negative electrode under high mix density conditions (1.7 g/cc) using the active material, it was confirmed that the high rate charge properties of the half battery of each example and comparative example were shown differently. It was analyzed that the results were due to the fact that the deformation degrees of the pore structure in the negative electrode active material layer were different, and it was suggested that for improving the high rate charge properties, both the rolling density of the active material and the pore structure (tortuosity, τ) of the negative electrode should be considered.

Specifically, it was confirmed that the examples satisfying Relation 1 of the present invention had significantly improved high rate charge properties relative to the comparative examples which did not satisfy Relation 1. However, in Comparative Example 1, artificial graphite having the same level of pellet density as Example 1 was used, but since the pore structure (τ) was not good under high mix density conditions, the high rate charge rate was very low, and in Comparative Example 2, the pellet density of artificial graphite was somewhat high and the pore structure was not good to show a deteriorated effect.

Meanwhile, in Examples 2 and 3, since the τ*$D_P$ value of the negative electrode produced satisfied the preferred numerical value range (4.3 to 6.4) of the present invention, it is considered that the lithium ion diffusion rate during the high rate charge process was significantly increased and negative electrode resistance was decreased. Specifically, in the production process (rolling process) of the negative electrode, the diffusion path of lithium ions in the negative electrode due to the deformation of the negative electrode active material particles was lengthened or production of dead-end pores was effectively suppressed, and thus, it is considered that more improved high rate charge efficiency was shown. Since Examples 1, 4, and 5 did not satisfy the range, relatively low high rate charge efficiencies were shown. The results suggest that it is preferred to adjust the τ*$D_P$ value of the negative electrode to 4.3 to 6.4.

[Evaluation Example 2]: Evaluation of Charge Efficiency of Secondary Battery Depending on Pellet Resistance of Negative Electrode Active Material Examples 6 and 7

The half batteries were produced in the same manner as in the above, except that the negative electrode active materials (artificial graphite) having the properties listed in Table 2 were used to produce the negative electrode.

The pellet resistance, the pore volume, and the average pore particle diameter of the negative electrode active material (artificial graphite) produced in Examples 1 to 7 and Comparative Examples 1 and 2 are shown in the following Table 2:

TABLE 2

|  | $R_P$ (mOhm) | D50 (μm) | $V_P$ (g/cc) | Pore size (nm) | $\tau * D_P$ (g/cc) | $D_P$ (g/cc) | Charge efficiency (%) |
|---|---|---|---|---|---|---|---|
| Example 1 | 5.01 | 14.4 | 0.229 | 767 | 7.13 | 1.829 | 89% |
| Example 2 | 6.41 | 13.4 | 0.211 | 646 | 5.08 | 1.693 | 91% |
| Example 3 | 5.89 | 11.1 | 0.244 | 651 | 6.10 | 1.793 | 92% |
| Example 4 | 5.54 | 12.7 | 0.214 | 586 | 6.46 | 1.657 | 90% |
| Example 5 | 5.94 | 9.5 | 0.233 | 708 | 7.13 | 1.783 | 88% |
| Example 6 | 8.39 | 13.2 | 0.306 | 623 | 9.98 | 1.56 | 82% |
| Example 7 | 3.84 | 10.5 | 0.198 | 675 | 9.30 | 1.83 | 78% |
| Comparative Example 1 | 4.84 | 12.8 | 0.114 | 890 | 8.13 | 1.808 | 79% |
| Comparative Example 2 | 5.24 | 12.1 | 0.134 | 902 | 8.21 | 2.002 | 80% |

Referring to Table 2, the example in which the resistance of the pellet was more than 5 (mOhm) showed better high rate performance than Comparative Example 1. Since the intrinsic resistance of the graphite material used as the active material in the examples and the comparative examples were all the same, having a large pellet resistance means that the material did not get pressed at the same pressure, which suggests that the material was less deformed, and thus, even when the material was applied to the negative electrode, the pore structure in the negative electrode was less deformed.

In Comparative Example 1, it was analyzed that the pellet resistance was relatively low and the high rate charge properties were deteriorated as compared with the examples, and in particular, in Examples 2 and 3, the pellet resistance was relatively high (5.5 to 6.5 mOhm) and battery performance was best. This means that the pores in the negative electrode active material layer were least deformed within the range of the pellet resistance of 5.5 to 6.5 mOhm. Meanwhile, when the pellet resistance was more than 6.5 mOhm (Example 6), problems arise, for example, it was determined that the conductivity of electrons in the electrode was excessively decreased to increase resistance, and thus, the high rate performance was rather decreased.

In addition, it was confirmed that in Comparative Example 2, the pellet resistance was 5 (mOhm) or more, but the pellet density was the highest, and the reason that the pellet resistance and the pellet density were in proportion was that resistances were different depending on the packing structures of the particles in the pellet. That is, since in Comparative Example 2, the pellet resistance was relatively high but the particles were deformed a lot, it was analyzed the pore structure in the negative electrode active material layer was deteriorated.

Meanwhile, in the examples in which the pore volume ($V_P$) was 0.2 g/cc or more, excellent high rate performance was shown as compared with the comparative example which the pore volume was not 0.2 g/cc or more. Having a low pore volume means that pore formation inhibition or pore closure was caused due to excessive deformation of the material to decrease the pore volume in the electrode, and suggests that performance deterioration may occur due to lack of pores in the electrode. In particular, in Examples 1 to 5, due to a preferred pore volume of 0.2 to 0.3, the battery performance was better than that of Examples 6 and 7.

In addition, the examples having the pore size in the electrode of 800 nm or less showed better battery performance than the comparative examples having a large pore size. Having a small pore size in the electrode means that the fine pores in the electrode are maintained well without being closed, which is considered as having excellent high rate performance. On the contrary, having a large pore size means that most of the fine pores in the electrode were deformed or closed due to excessive deformation of the material, and thus, in particular, it is considered that Examples 2 to 4 showed the best battery performance. Meanwhile, when the pore size is 600 nm or less which is excessively small, there was no problem in expressing high rate performance, but due to an increased reaction area in the electrode, high specific reversible capacity and long-term life characteristic deterioration during the charge and discharge process may occur, and thus, it was found that the most preferred range of pore size is 600 to 800 nm.

[Evaluation Example 3]: Evaluation of Charge Efficiency of Secondary Battery Depending on whether Relations 3 to 5 ($V_P$, D, $D_T$ values) were Satisfied

TABLE 3

|  | Active material particle size (D50, μm) | DT (g/cc) | $V_P$ (g/cc) | Charge efficiency (%) |
|---|---|---|---|---|
| Example 1 | 14.4 | 0.94 | 0.229 | 89% |
| Example 2 | 13.4 | 1.04 | 0.211 | 91% |
| Example 3 | 11.1 | 0.98 | 0.244 | 92% |
| Example 4 | 12.7 | 0.92 | 0.214 | 90% |
| Example 5 | 9.5 | 1.00 | 0.233 | 88% |
| Comparative Example 1 | 12.8 | 1.05 | 0.114 | 79% |
| Comparative Example 2 | 12.1 | 0.97 | 0.134 | 80% |

Referring to Table 3, it was confirmed that Examples 1 to satisfying all of the three conditions: the active material particle size (D50) of 8 to 20 μm, the tap density ($D_T$) of 0.8 to 1.5 g/cc, and the negative electrode pore volume ($V_P$) of 0.2 to 0.5 g/cc showed excellent high rate charge efficiency as compared with Comparative Examples 1 and 2 which did not satisfy the conditions.

The negative electrode for a secondary battery according to the present invention may implement a high mix density in spite of using a negative electrode active material having a low pellet density to show excellent capacity and performance.

In addition, the negative electrode may supply a smooth migration channel for a lithium ion even under high mix density conditions to significantly increase high rate charge and discharge performance and life characteristics depending on the cycle.

Although the exemplary embodiments of the present invention have been described above, the present invention is not limited to the exemplary embodiments but may be made in various forms different from each other, and those skilled in the art will understand that the present invention may be implemented in other specific forms without departing from the spirit or essential feature of the present invention. Therefore, it should be understood that the exemplary embodiments described above are not restrictive, but illustrative in all aspects.

What is claimed is:

1. A negative electrode for a secondary battery comprising:
   a current collector; and
   a negative electrode active material layer comprising a negative electrode active material, formed on the current collector,
   wherein the negative electrode satisfies the following Relation 1:

$$3.0<\tau*D_P<7.2 \quad \text{[Relation 1]}$$

wherein $\tau$ is a tortuosity of the negative electrode, $$\tau=(R_{ion}\times A\times \kappa\times \varepsilon)/d$$

wherein $R_{ion}$ is an ionic diffusion resistance (Ohm) by impedance analysis, A is an area of a negative electrode (cm$^2$), $\kappa$ is an ion conductivity (mS/cm) of an electrolyte solution, $\varepsilon$ is a porosity of a negative electrode, and d is a thickness (μm) of a negative electrode, and
   $D_P$ is a pellet density (g/cm$^3$) of the negative electrode active material, measured by pressing the negative electrode active material at 8 kN/cm$^2$.

2. The negative electrode for a secondary battery of claim 1, wherein the negative electrode has a tortuosity ($\tau$) of 1 to 4.

3. The negative electrode for a secondary battery of claim 1, wherein the negative electrode active material has a pellet density ($D_P$) of 1.0 to 2.0 g/cm$^3$.

4. The negative electrode for a secondary battery of claim 3,
   wherein the negative electrode active material has a pellet resistance ($R_P$) of 0.005 to 0.01 Ohm, and
   the pellet resistance is a resistance value measured by pressing the negative electrode active material at 8 kN/cm$^2$.

5. The negative electrode for a secondary battery of claim 1, wherein the negative electrode further satisfies the following Relation 2:

$$4.3<\tau*D_P<6.4 \quad \text{[Relation 2]}$$

wherein $\tau$ is a tortuosity of the negative electrode, and $D_P$ is a pellet density of the negative electrode active material, measured by pressing the negative electrode active material at 8 kN/cm$^2$.

6. The negative electrode for a secondary battery of claim 1, wherein the negative electrode active material is a carbonaceous active material.

7. The negative electrode for a secondary battery of claim 1, wherein the negative electrode satisfies at least two of the following Relations 3 to 5:

$$0.2<V_P<0.5 \quad \text{[Relation 3]}$$

wherein $V_P$ is a pore volume (cc/g) of the negative electrode, $$0.8<D<20 \quad \text{[Relation 4]}$$

wherein D is D50 (μm) of the negative electrode active material, $$0.8<D_T<1.5 \quad \text{[Relation 5]}$$

wherein $D_T$ is a tap density (g/cc) of the negative electrode active material.

8. The negative electrode for a secondary battery of claim 1, wherein a pore size in the negative electrode active material layer is 500 to 800 nm.

9. The negative electrode for a secondary battery of claim 1, wherein the negative electrode has a mix density of 1.65 g/cc to 1.85 g/cc.

10. A secondary battery comprising: the negative electrode of claim 1; a positive electrode; a separator; and an electrolyte solution.

* * * * *

UNITED STATES PATENT AND TRADEMARK OFFICE
CERTIFICATE OF CORRECTION

| | | |
|---|---|---|
| PATENT NO. | : 12,244,001 B2 | Page 1 of 1 |
| APPLICATION NO. | : 17/577624 | |
| DATED | : March 4, 2025 | |
| INVENTOR(S) | : Chan Young Jeon et al. | |

It is certified that error appears in the above-identified patent and that said Letters Patent is hereby corrected as shown below:

In the Claims

Column 14, Line 26, Claim 7, delete "$0.8<D<20$" and insert -- $8<D<20$ --

Signed and Sealed this
Twentieth Day of May, 2025

Coke Morgan Stewart
*Acting Director of the United States Patent and Trademark Office*